United States Patent Office 2,748,956
Patented June 5, 1956

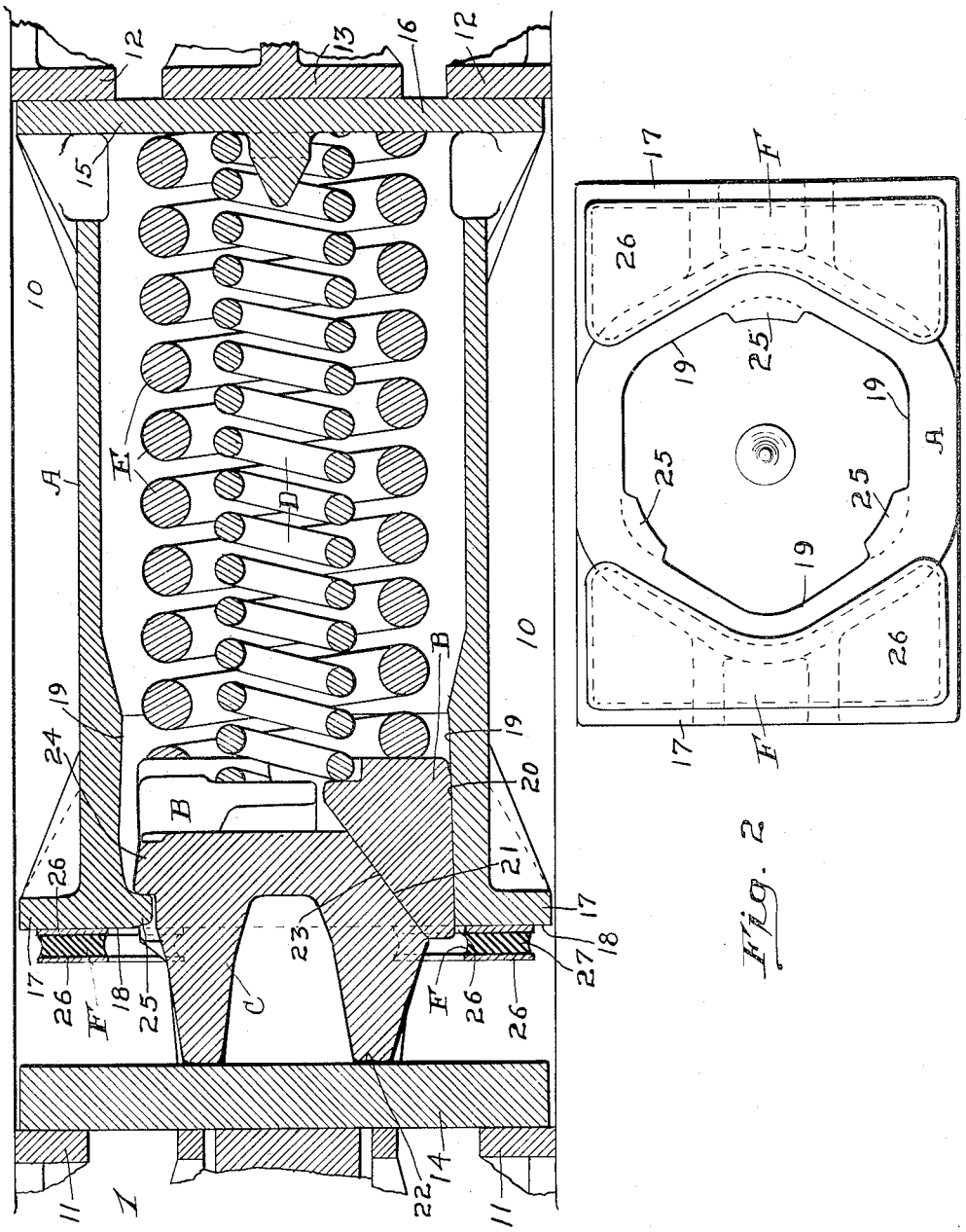

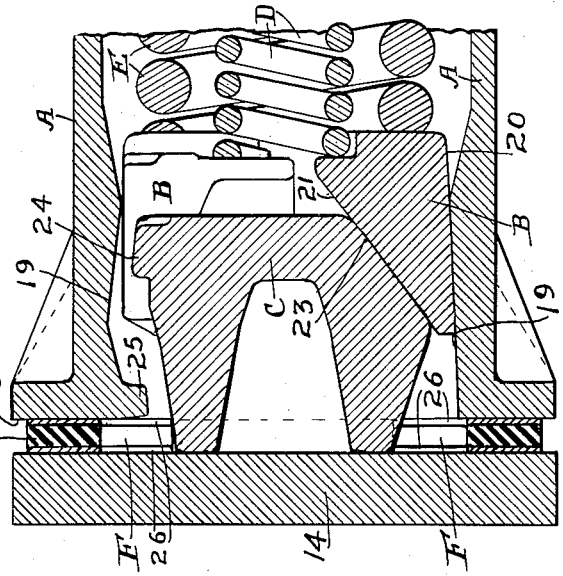
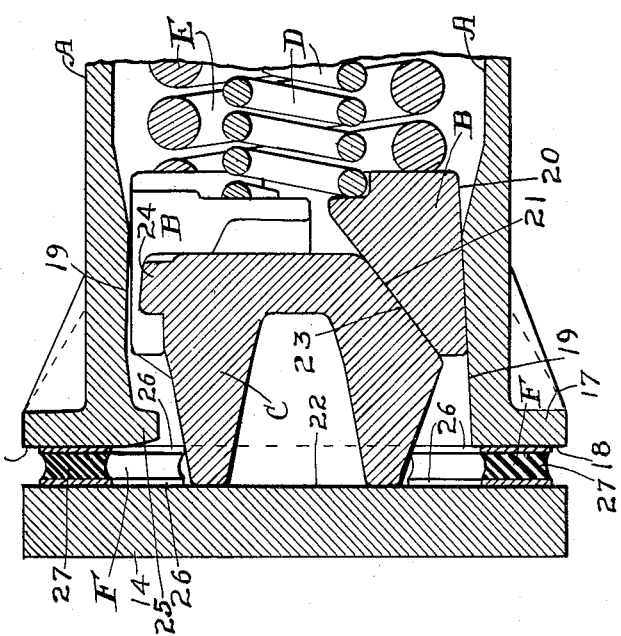

2,748,956

COMBINED RUBBER AND FRICTION SHOCK ABSORBING MECHANISM

Vernon S. Danielson, Chicago, and William D. Wallace, Park Forest, Ill., assignors to W. H. Miner, Inc., Chicago, Ill., a corporation of Delaware Application May 27, 1952, Serial No. 290,262

2 Claims. (Cl. 213—34)

This invention relates to improvements in combined rubber and friction shock absorbing mechanisms for railway draft riggings.

One object of the invention is to provide an auxiliary cushioning unit including a rubber member arranged to be compressed in unison and parallel with a friction shock absorber of a railway draft rigging during the last part of the compression stroke of the mechanism.

Another object of the invention is to provide a combined rubber and friction shock absorbing mechanism, comprising a friction casing, a spring resisted friction clutch slidingly telescoped within the casing, a front follower movable lengthwise of the mechanism toward and away from the casing, and rubber means mounted on the front end of the casing and engageable by said front follower to be compressed in parallel with the friction means of the mechanism, during the last part of the compression stroke, the rubber means insulating the mechanism against metal to metal contact between the front follower and the friction casing.

A further object of the invention is to provide a combined rubber and friction shock absorbing mechanism, including a friction casing, yieldingly resisted friction shoes slidable within the casing, a wedge engaging the shoes and projecting outwardly beyond the casing, a front follower engaging the wedge, and rubber shock absorbing units mounted on the front end of the casing engageable by and compressible between said front follower and casing during the last part of the compression stroke of the mechanism, in unison and in parallel with the friction means.

Other objects of the invention will more clearly appear from the description and claims hereinafter following.

In the accompanying drawings forming a part of this specification, Figure 1 is a horizontal longitudinal sectional view of a portion of the draft rigging of a railway car, showing our improved combined rubber and friction shock absorbing mechanism in connection therewith, the latter also being shown in horizontal longitudinal section. Figure 2 is a front elevational view of the improved mechanism shown in Figure 1, with the front follower, friction clutch, and springs omitted. Figure 3 is a view similar to Figure 1 of the front portion of the friction casing of the shock absorbing mechanism and the associated front follower, illustrating the mechanism compressed to a predetermined extent. Figure 4 is a view similar to Figure 3, showing the mechanism still further compressed.

In said drawings, 10—10 indicate the center sills of a railway draft rigging, provided with the usual front and rear stop lugs 11—11 and 12—12. The yoke of the draft rigging is indicated by 13, and enclosed within this yoke is our improved combined rubber and friction shock absorbing mechanism and front follower 14.

Our combined friction and rubber shock absorbing mechanism proper comprises broadly a friction casing A, friction shoes B, of which there are preferably three, a wedge C, inner and outer springs D and E, and rubber cushioning units F—F mounted on the front end of the friction casing.

The friction casing A is in the form of a hollow tubular member of hexagonal transverse cross section, open at its front end and closed at its rear end by a transverse wall 15, which projects beyond opposite sides of said casing to provide an integral rear follower member 16. At the open front end thereof, the casing A has a pair of laterally projecting flanges 17—17, which are located at opposite sides of the casing, each of said flanges having straight vertical side edges and horizontal top and bottom edges, thus together presenting a follower platelike structure of substantially rectangular outline. The flanges 17—17 present vertically extending, forwardly facing, flat surfaces 18—18 at opposite sides of the open end portion of the casing A. The casing A is provided with three interior friction surfaces 19—19—19 at its front end, which are of V-shaped transverse cross section.

The friction shoes B, two of which are shown in Figures 1, 2, and 3, are three in number, and each shoe B has a V-shaped friction surface 20 on its outer side cooperating with the corresponding V-shaped friction surface 19 of the casing. Each shoe further has a V-shaped wedge face 21 on its inner side.

The wedge C is in the form of a block having a flat front end face 22, bearing on the follower 14. At its rear end, the wedge C is provided with three V-shaped wedge faces 23—23—23. Each wedge face 23 of the wedge C engages with the wedge face 21 of the corresponding shoe B. The wedge C is also provided with three radial lugs 24—24—24, which are alternated with the wedge faces 23—23—23 thereof, extending between adjacent shoes, and are engaged in back of inturned lugs 25—25—25 on the casing A to limit outward movement of and hold the wedge assembled with the casing.

The springs D and E are disposed within the casing A, each spring being in the form of a helical coil having its opposite ends bearing on the inner ends of the shoes B—B—B and the end wall 15 of the casing A.

The rubber cushioning units F—F are mounted on the front end of the casing A at opposite sides thereof, being fixed respectively to the flanges 17—17. Each cushioning unit F is of the outline shown in Figure 2, being of such a size that it occupies the major portion of the area provided by the flat front surface 18 of the corresponding flange 17. Each of the units F comprises a pair of metal plates 26—26 and an interposed rubber pad 27 vulcanized to said plates. The exposed peripheral edges of the pad are dished inwardly, that is, they are of concave formation so that the material of the pad will not protrude beyond the peripheral edges of the plates 26—26 when the unit is compressed to a predetermined maximum extent. Each rubber cushioning unit is secured to the outer surface 18 of the corresponding flange 17 in any suitable manner, being preferably spot welded to the same.

The operation of our improved shock absorbing mechanism is as follows: During a draft action being applied to the yoke 13, the casing A is pulled forwardly, compressing the mechanism against the front follower 14, which at this time is held against forward movement by the front stop lugs 11—11. During a buffing action, the front follower 14 is forced rearwardly toward the casing A, which is held stationary by engagement of the rear follower thereof with the rear stop lugs 12—12, thus compressing the mechanism. As the mechanism is being compressed in either draft or buff, the wedge C is forced inwardly of the casing A, spreading the shoes B apart and sliding the same inwardly on the friction surfaces 19—19—19 of the casing, resisted by the springs D and E, thereby absorbing the shocks encountered in service. During this time, the follower 14 approaches the front end of the casing A to engage the rubber cushioning units F—F, as shown in Figure 3. During further compression of the mechanism, the rubber cushioning units F—F are compressed in unison or in parallel with the friction shock absorbing mechanism, as illustrated in Figure 4.

We claim:

1. In a combined rubber and friction shock absorbing mechanism, the combination with a friction shock absorber, including a friction casing open at one end, friction shoes slidingly telescoped within the open end of the casing, a wedge in wedging engagement with the shoes, and yielding means within the casing opposing inward movement of said shoes; of laterally, oppositely projecting flanges at the front end of the casing; a front follower movable toward and away from said casing, said follower being engaged with said wedge to actuate the same; a metal plate disposed upon each of said flanges; welds fixing said plates on the flanges; a rubber pad bonded to said plate; a second metal plate parallel to the first plate and bonded to said rubber pad, said follower engaging said second plate after a predetermined compression of the mechanism to compress the rubber pads in parallel with the friction shock absorber during further movement of the follower toward said casing.

2. In a combined rubber and friction shock absorbing mechanism, the combination with a friction shock absorber, including a friction casing open at one end, friction shoes slidingly telescoped within the open end of the casing, a wedge in wedging engagement with the shoes, and yielding means within the casing opposing inward movement of said shoes; of a front follower movable toward and away from said casing, said follower being engaged with said wedge to actuate the same; flanges projecting outwardly from the front end of said casing and terminating in outer edges aligned with the outer edges of said follower; a metal plate disposed upon each of said flanges with the edges of the plate disposed inwardly of the edges of the flange; welds securing said plate to the flange; a rubber pad bonded to each one of said plates; a second metal plate parallel to and aligned with each one of the first plates and bonded to the rubber pads, said follower engaging said second plates after a predetermined compression of the mechanism to compress said rubber pads in parallel with friction shock absorber during further movement of the follower toward said casing.

References Cited in the file of this patent

UNITED STATES PATENTS

| 1,860,540 | Haseltine | May 31, 1932 |
| 2,552,701 | Withall | May 15, 1951 |
| 2,554,606 | Withall | May 29, 1951 |
| 2,592,731 | Peterson | Apr. 15, 1952 |

FOREIGN PATENTS

| 461,577 | Great Britain | Feb. 19, 1937 |